(12) United States Patent
Cook et al.

(10) Patent No.: US 7,726,184 B2
(45) Date of Patent: *Jun. 1, 2010

(54) SURFACE ACOUSTIC WAVE SENSOR AND PACKAGE

(75) Inventors: James D. Cook, Freeport, IL (US);
Brian J. Marsh, Freeport, IL (US);
Mohammed A J Qasimi, Columbus, OH (US); Daniel Dixon, Cedarville, IL (US); Sachin Kumar, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/239,363

(22) Filed: Sep. 26, 2008

(65) Prior Publication Data

US 2009/0167503 A1    Jul. 2, 2009

Related U.S. Application Data

(63) Continuation-in-part of application No. 11/966,076, filed on Dec. 28, 2007.

(51) Int. Cl.
*B60C 23/02* (2006.01)
*G01M 1/14* (2006.01)
(52) U.S. Cl. ........................................ 73/146.5; 73/1.82
(58) Field of Classification Search ........................ None
See application file for complete search history.

(56) References Cited

U.S. PATENT DOCUMENTS

| | | | |
|---|---|---|---|
| 4,100,811 | A | 7/1978 | Cullen et al. |
| 4,295,102 | A | 10/1981 | Schmidt et al. |
| 4,333,342 | A | 6/1982 | Gilden et al. |
| 4,598,587 | A | 7/1986 | Dwyer et al. |
| 4,621,530 | A | 11/1986 | Dwyer et al. |
| 5,634,476 | A * | 6/1997 | Orkin et al. .................. 600/588 |

(Continued)

FOREIGN PATENT DOCUMENTS

DE    10215834    11/2003

(Continued)

OTHER PUBLICATIONS

Benes et al., "Comparison between BAW and SAW Sensor Principles," IEEE International Frequency Control Symposium, pp. 5-20, 1997.

(Continued)

*Primary Examiner*—Lisa M Caputo
*Assistant Examiner*—Jermaine Jenkins

(57) ABSTRACT

The SAW sensor in a stainless steel button package having a diaphragm and mounted on a threaded port. Package can hermetically seal a sensor and RFID-antenna assemblies from media. Sensor diaphragm is exposable to media. Sensor and RFID antennas communicate electrically with SAW sensor and RFID device, respectively, for sensor measurements and identification. Antennas receive RF interrogation signal from a nearby interrogator/transceiver and send reflected RF signals back to the interrogator unit containing sensor measurement and sensor ID. TRF signal excites a SAW resonator inside the sensor and causes the SAW to resonate wherein resonant frequency changes with pressure and temperature applied to the sensor. Antennas could be printed circuit board antennas, helical antennas, loop antennas, any other commercially available off-the-shelf antennas or a combination of these.

16 Claims, 8 Drawing Sheets

U.S. PATENT DOCUMENTS

| | | | |
|---|---|---|---|
| 5,821,425 A * | 10/1998 | Mariani et al. | 73/703 |
| 6,003,378 A | 12/1999 | Scherr et al. | |
| 6,335,667 B1 | 1/2002 | Takagi et al. | |
| 6,553,836 B2 | 4/2003 | Williams | |
| 6,710,682 B2 * | 3/2004 | Onishi et al. | 333/193 |
| 6,758,089 B2 | 7/2004 | Breed et al. | |
| 7,002,282 B2 * | 2/2006 | Mishima | 310/313 R |
| 7,082,835 B2 | 8/2006 | Cook et al. | |
| 7,100,451 B2 * | 9/2006 | Solie | 73/703 |
| 7,109,632 B2 | 9/2006 | van Knokke | |
| 7,129,828 B2 * | 10/2006 | Cook | 340/447 |
| 7,165,298 B2 | 1/2007 | Ehlers et al. | |
| 7,243,547 B2 | 7/2007 | Cobianu et al. | |
| 7,298,067 B1 * | 11/2007 | Kosinski et al. | 310/341 |
| 2003/0005759 A1 | 1/2003 | Breed et al. | |
| 2006/0179918 A1 | 8/2006 | Liu | |
| 2006/0238078 A1 | 10/2006 | Liu | |
| 2008/0265711 A1 | 10/2008 | Kumar et al. | |

FOREIGN PATENT DOCUMENTS

| | | |
|---|---|---|
| WO | 0220287 | 3/2002 |
| WO | 0231461 | 4/2002 |
| WO | 03078950 | 9/2003 |
| WO | 03081195 | 10/2003 |

OTHER PUBLICATIONS

Buff, et al., "Passive Remote Sensing for Temperature and Pressure Using SAW Resonator Devices," IEEE Transactions on Ultrasonics, Ferroelectrics, and Frequency Control, vol. 45, No. 5, pp. 1388-1392, Sep. 1998.

Reindl, et al., "Theory and Application of Passive SAW Radio Transponders as Sensors," IEEE Transactions on Ultrasonics, Ferroelectrics, and Frequency Control, vol. 45, No. 5, pp. 1281-1292, Sep. 1998.

Scherr et al., "Quartz Pressure Sensor Based on SAW Reflective Delay Line," IEEE Ultrasonics Symposium, pp. 347-350, 1996.

Schimetta et al., "Optimized Design and Fabrication of a Wireless Pressure and Temperature Sensor Unit Based on SAW Transponder Technology," IEEE MTT-S International Microwave Symposium Digest, pp. 355-358, 2001.

Reindl et al., "SAW Devices as Wireless Passive Sensors," IEEE Ultrasonics Symposium, pp. 363-367, 1996.

Scholl et al., "Wireless Passive SAW Sensor Systems for Industrial and Domestic Applications," IEEE International Frequency Control Symposium, pp. 595-601, 1998.

Tiersten, et al., "An Analysis of the Normal Acceleration Sensitivity of ST-Cut Quartz Surface Wave Resonators Rigidly Supported Along the Edges," 41st Annual Frequency Control Symposium, pp. 282-288, 1987.

* cited by examiner

SURFACE ACOUSTIC WAVE SENSOR AND PACKAGE

RELATED PATENT APPLICATIONS

This application is a Continuation-In-Part (CIP) under 25 U.S.C. §120 of U.S. patent application Ser. No. 11/966,076, filed on Dec. 28, 2007, and incorporated herein by reference in its entirety.

TECHNICAL FIELD

Embodiments are generally related to sensors, and in particular pressure and temperature sensors and systems. Embodiments are also related to surface acoustic wave (SAW) devices, bulk acoustic wave (SAW) devices and, more particularly, to a pressure and/or temperature sensor assembled as a self-contained batteryless, transmitterless system. Embodiments are additionally related to wireless and batteryless pressure and/or temperature sensors used in mobile and industrial applications.

BACKGROUND OF THE INVENTION

Surface acoustic wave (SAW) devices used as sensors in measurement systems are known. For example, a tire pressure monitoring system (TPMS) helps to improve fuel economy and improve handling and safety by warning the driver about low tire pressure. TPMS is a vehicle-embedded system detecting the tire pressure by analyzing the difference between the wheel speeds or by direct measurement of pressure and temperature. Systems like a direct TPMS system typically consists of one central transceiver in the vehicle and four sensors mounted on the wheel rim, or valve stem to sense pressure and temperature inside the tire, and to organize data transmission to/from the central transceiver.

Various other SAW sensor applications are known in the art. In particular, many different techniques have been proposed for sensing the temperature of a component in an industrial process or system. SAW based pressure and temperature sensors, can be used in industrial and commercial systems to convey pressure and temperature values during processing operations such as filling, pumping, drilling, evacuating, dispensing, sealing, machine control, and condition monitoring applications in automotive, food and beverage, dairy, petroleum, medical, aircraft and surface transportation applications.

The majority of prior art sensors are direct active systems, some utilizing a silicon micro-electro-mechanical system (MEMS) capacitive or piezo-resistive based sensor powered by a battery. Where several sensors are utilized throughout a target system, pressure and temperature information is transmitted by radio frequencies from each sensor location (e.g., each of the wheels on a motor vehicle) to a central transceiver, located in or around the electronic control unit (ECU) and displayed as either a number or a warning indicator. The problem associated with using such prior art systems in, for example, a TPMS environment is that the need to remove the tire for access to the batteries, and the need to rebalance the tires after battery replacement, together with the disposal of worn out batteries are the major shortcomings of direct sensing systems. Batteries inside tires add weight, have limited life and cannot be replaced. Furthermore, they have inherent battery related performance issues such as temperature dependent voltage and current variations of the battery. These type of variations can cause inaccuracy in the sensor output that result in pressure or temperature reading errors.

Conventional wireless systems are not durable and are expensive to design and produce. The sensors and transmitters must also be able to withstand the harsh environment, such as when used inside a vehicle tire that includes high and low temperatures, shock and vibration, and centrifugal forces from tire rotation. Although they also feature wireless communication of the pressure and temperature values to a remotely placed central transceiver, they are difficult to install and service, and have significantly more electronics along with a battery in the wheel sensor to enable communications. More electronics in the wheel sensor and the previously mentioned battery voltage and current errors tend to make these types of devices less reliable. Also the wireless sensors utilizing a battery are not suitable for applications requiring intrinsically safe operations such as for e.g. petrochemical industry.

A need therefore exists for an improved wireless and batteryless sensor apparatus and easy to install packaging system, which can be integrated into a moving or rotating object such as for e.g. tire, industrial apparatus etc. and interrogated wirelessly, and that the sensors are ultimately more efficient and more reliable with fewer components than presently implemented sensors. Such an apparatus is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems.

It is another aspect of the present invention to provide for improved wireless, batteryless and transmitterless SAW pressure sensor with housing options.

The aforementioned aspects and other objectives and advantages can now be achieved as described herein. A wireless and batteryless pressure sensor apparatus comprises of a SAW sensor and a sensor antenna. The SAW sensor alone in combination with a sensor antenna can adequately operate from a nearby interrogator. SAW devices are resonators whose resonant frequency changes when strained. Working at radio frequencies, SAW sensing devices can be wirelessly excited with an interrogation pulse. The response (partial echo of the RF from the interrogator) from the SAW sensor can be measured to allow at least one of pressure and/or temperature to be calculated.

Optionally, A passive RFID device can be added to the SAW sensor system for sensor identification. An RFID device can be mounted on a printed circuit board with the SAW sensor. A SAW sensor antenna and an RFID antenna can be printed on the same or different printed circuit boards such that the antennas communicate electrically with the SAW sensor and the RFID device for sensor measurement and sensor identification (ID). As with the SAW sensor only solutions, the sensor can be interrogated utilizing a radio frequency, which can be used to excite a SAW resonator inside the sensor. The interrogation signal causes the SAW to resonate wherein the resonant frequency changes with the pressure and temperature that is applied to the sensor.

A SAW sensor can be designed in a button package which results in a full line of sensors for use with harsh media. The Sensor button can preferably sense the media pressure and/or temperature through direct contact of it's diaphragm with the media and is also capable of sensing the same through indirect means when pressure and/or temperature are indirectly applied to it's diaphragm through a transmission mean such as for, e.g., a flexible wall isolating the sensor from media in applications requiring cavity free installation. The sensor can be used in a wide variety of pressure ranges, port styles, and termination types.

The printed circuit board can be mounted on a threaded stainless steel or plastic port and over packaged with standard processes for sealing the sensor, and/or the sensor combined with an RFID device. SAW sensor button is mounted on port using welding process in case of a stainless steel port and using an O-ring elastomer or epoxy in case of a plastic port. The threaded port along with a plastic cover to seal the non-sensor side of the port completes the sensor housing.

Antennas are capable of receiving a radio frequency signal. When the antenna receives the particular signal associated with the sensor, or sensor+RFID device, the measurement generated by the sensor can be directed to and transmitted by the sensor antenna to the nearby transceiver/interrogator.

A wireless and batteryless pressure and/or temperature sensor apparatus comprises of a SAW sensor and an antenna for pressure and/or temperature data with an optional passive RFID device with an antenna for sensor identification (ID). The RF signal excites a SAW resonator inside the sensor and causes the SAW to resonate wherein a resonant frequency changes with the pressure and temperature that is applied to the sensor. Antennas could be printed circuit board antennas, helical antennas, loop antennas, any other commercially available off-the-shelf antennas or a combination of these. Housing and packaging methods results into a small size, light weight, easy to install wireless and batteryless pressure and/or temperature sensor apparatus which provides sensor data along with sensor ID for different applications. A threaded port can be made of either stainless steel material or plastic material apart from several other material options. Sensor buttons can be mounted on port using a welding process in case of a stainless steel port and using an O-ring elastomer or epoxy in case of a plastic port.

A sensor as will be further described herein can be adapted for use as a pressure and/or temperature sensing product for broad use in industrial, commercial, petroleum and automotive markets (e.g., TPMS). In a TPMS application, the sensor housing can be integrated with the valve stem inside the tire, strapped on the rim inside the tire, or mounted to the rim outside the tire. Such a sensor can also be utilized for moving parts such as tires, wheels, suspensions, rotary pumps, pistons, valves, and other pressure tanks or vessels.

The SAW pressure sensor apparatus disclosed herein can therefore sense pressure and temperature for use in harsh media, applications with moving/rotating objects and is resistant to the effects of shock, vibration and hostile environments. The sensor is more reliable due to absence of electronic circuitry on the sensor side and also due to the fact that it's batteryless. This also makes a good candidate for applications requiring intrinsically safe operations such as for e.g. petrochemical industry. The overall housing and packaging methods mentioned herein results into a small size, light weight, easy to install, wireless and batteryless pressure and/or temperature sensor apparatus which provides sensor data along with sensor ID for different applications.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION OF THE EMBODIMENTS

Figure 1A:
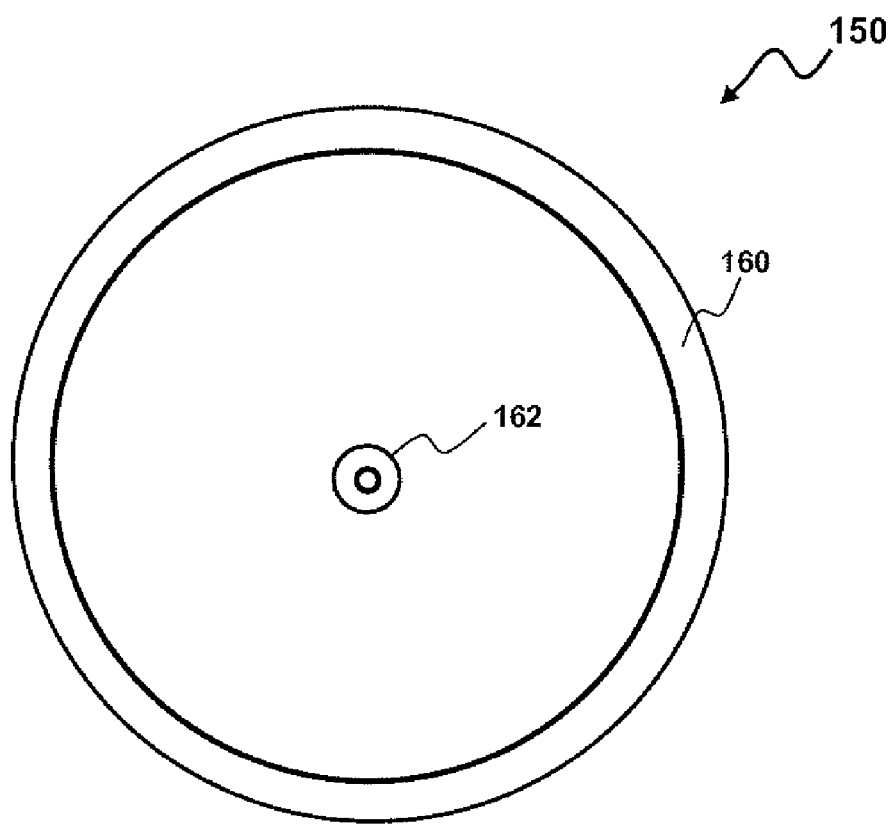
FIG. 1A illustrates a top view of a SAW sensor button package, which can be implemented in accordance with a preferred embodiment.

The particular values, configurations and applications discussed in these non-limiting examples can be varied and are cited merely to illustrate at least one embodiment and are not intended to limit the scope thereof. Note that in FIGS. 1-8 identical parts or elements are generally indicated by identical reference numerals.

Referring to FIG. 1A a top view of a SAW sensor button package 150 is illustrated, which can be implemented in accordance with a preferred embodiment. Pressure sensor package 150 generally includes a package cover 160 that includes a dimple 162 formed at the center of cover 160. Pressure sensor package 150 can be implemented as a SAW pressure and/or temperature sensor.

Figure 1B:
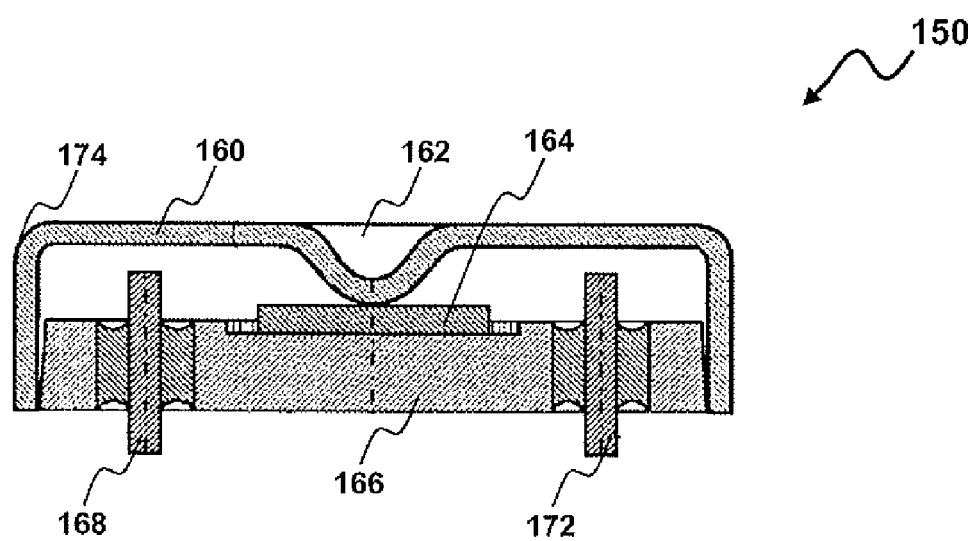
FIG. 1B illustrates a side view of the SAW sensor button package, which can be implemented in accordance with a preferred embodiment.

Referring to FIG. 1B a side view of the SAW sensor button package 150 is illustrated, which can be implemented in accordance with a preferred embodiment. Cover 160 thus generally includes a dimple 162 formed at the center of cover 160. A quartz sense element 164 can be located below proximate to dimple 162 and between mounting pins 168 and 172. Pressure sensor 150 can be implemented as a SAW pressure sensor that includes a quartz sense element 164 (e.g., a SAW chip), and a package base 166. The sensor diaphragm 174 can be hermetically welded to the front end of the base 166 The pressure sensor 150 described herein can be utilized to measure pressure and temperature inside monitored systems, such as a vehicle tire (e.g., a passenger car tire or truck tire). When used as A TPMS, the pressure sensor 150 should preferably possess a low cross sectional area and thickness, and be generally lightweight in configuration to be compatible for truck tires and passenger car tires.

Figure 2:
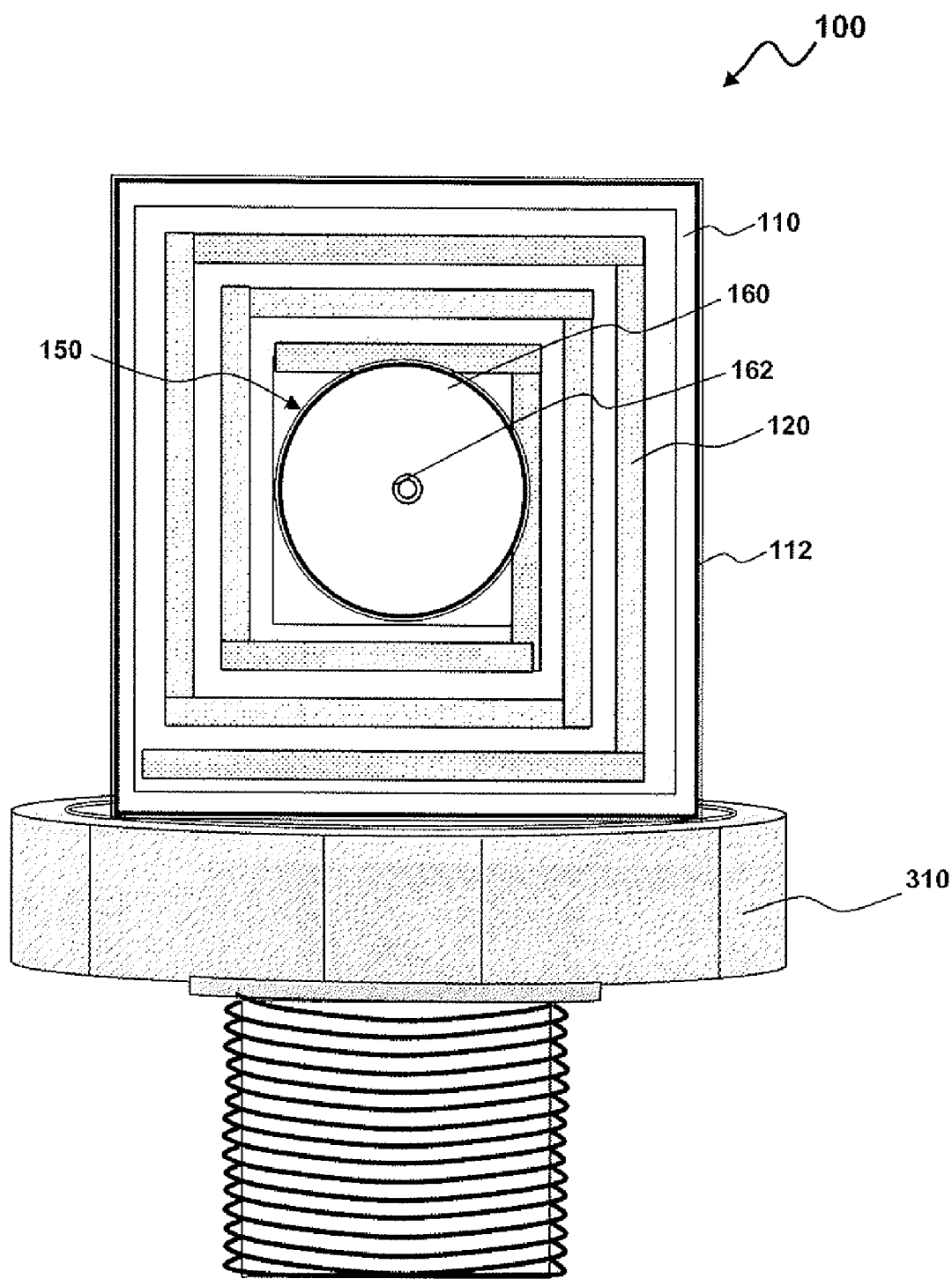
FIG. 2 illustrates a perspective view of the sensor antenna assembly mounted on a stainless steel port, in accordance with a preferred embodiment.

Referring to FIG. 2 an exploded view of a SAW sensor system 100 in accordance with a preferred embodiment of the invention. The sensor system 100 can include a printed circuit board 110. that can be formed from a high-performance polyimide film material that is currently available and utilized in the electronics arts such as, for example, Kapton®. Kapton® is a registered trademark of the E. I. DuPont de Nemours and Company. The SAW sensor system as depicted includes a SAW sensor 150 and sensor antenna assembly 120 as illustrated, and which can be implemented in accordance with a preferred embodiment of the present invention. The SAW sensor 150 is combined with an antenna 120 on the printed circuit board 110 and assembled in a stainless steel port package 310 for use in various applications. The sensor and antenna portions can then be packaged to protect them from debris, as will be described in more detail below.

Figure 3:
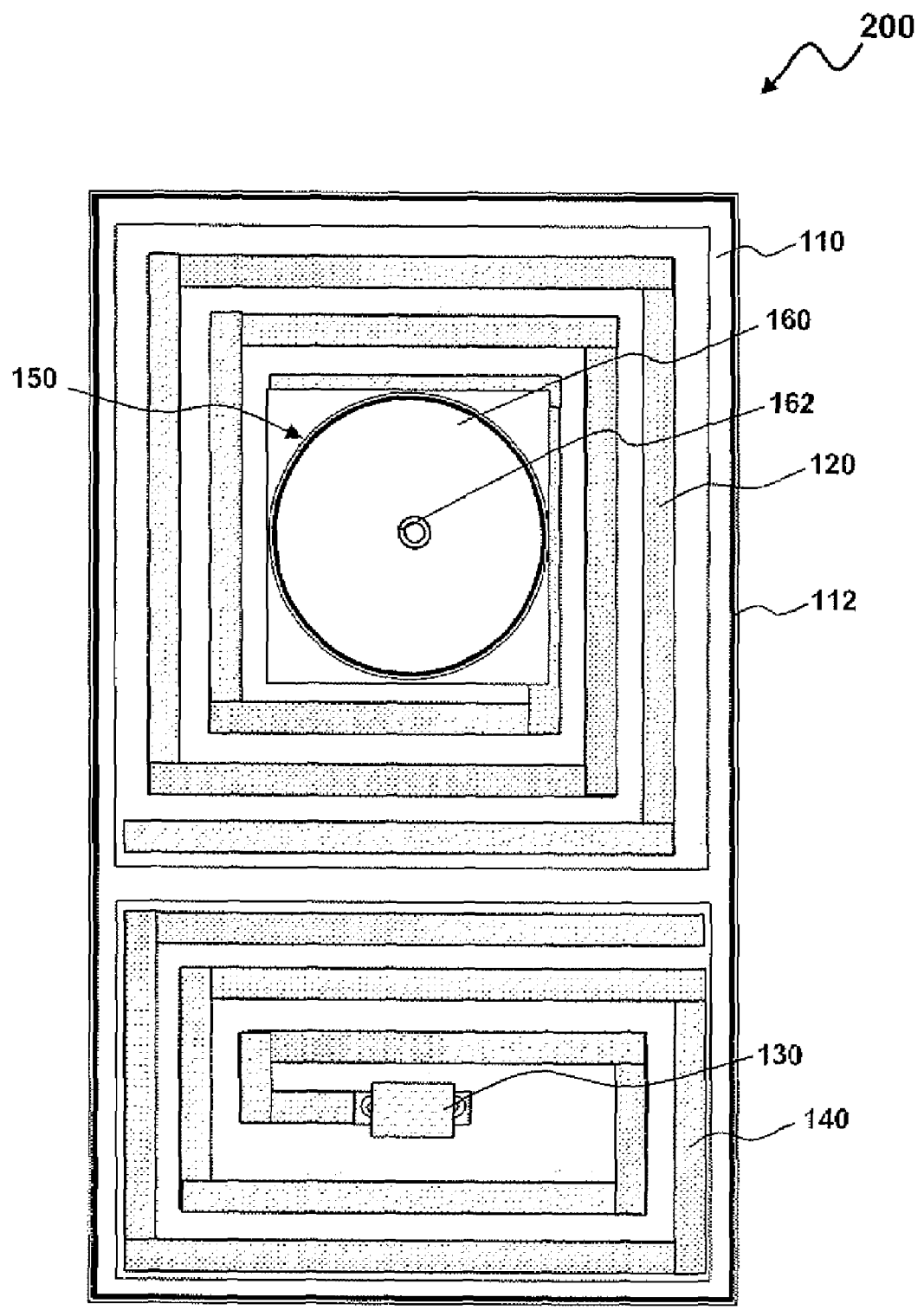
FIG. 3 illustrates an perspective view of a sensor antenna assembly including a SAW sensor and RFID component which can be implemented in accordance with a alternative embodiment.

Referring to FIG. 3 an exploded view of a SAW sensor system 200 is illustrated, which can be implemented in accordance with an alternative embodiment of the present invention. Sensor package 150 described in FIG. 2 can be modified for use with radio-frequency identification (RFID) device 130. The sensor antenna assembly 100 can therefore function as a combined SAW sensor 150 and RFID device 130 that permits proximity-based communications between the reader and the SAW sensor and RFID devices. Radio frequency identification device (RFID) 130 can be utilized to provide unique identification for a given sensor enabling tracking abilities for the sensor or apparatus that the sensor is mounted to. The sensor system 100 can include a printed circuit board 110. that can be formed from a high-performance polyimide film material that is currently available and utilized in the electronics arts such as, Kapton®. The assembly 100 can also include a surface acoustic wave (SAW) sensor 150 and sensor antenna 120 and an RFID 130 and RFID antenna 140, which can be electronically connected. The SAW sensor antenna 120 and the RFID antenna 140 can be a shared antenna and enable communication or electrical connection between the SAW sensor package 150 and the RFID device 130. The SAW sensor package 150 can be configured from one or more SAW sensing elements. Such a configuration therefore permits wireless interrogation of SAW sensor package 150 from an external wireless source, such as, for example, a wireless data transmitter and receiver device (e.g., interrogator), which is located external to the sensor assembly 100.

Antennas 120 and 140 can be printed on a polyimide substrate 112 such as, for example, Kapton®. Antennas 120 and 140 can therefore constitute flexible circuit antenna configurations and/or antenna ribbons. Antennas 120 and 140 can be printed onto a substrate 112 (or tape) formed from a polyimide film material such as, for example, Kapton®. It can be appreciated that other types of polyimide films can be utilized in place of Kapton® in accordance with alternative embodiments. The use of Kapton® is therefore discussed herein for general illustrative and edification purposes only and is not considered a limiting feature of the embodiments disclosed herein.

As utilized herein with respect to the invention, the term "RFID device," and so forth, generally can refer to a device that includes a loop antenna of one or more turns coupled to an electronic device, wherein the electronic device both receives signals via the loop antenna and transmits signals via the loop antenna. Specific measurement parameters can also be extracted from certain SAW RFID configurations to produce a passive wireless sensor capable of conveying an identification code if required along with temperature, pressure or other similar measurements back to an interrogation reader. Such uniquely identifiable sensors can be well suited for the automotive industry where a single reader located in an automobile could communicate and monitor pressure, temperature and other useful parameters.

The received signals with respect to the wireless article may include signals for controlling and/or operating the electronic device and/or for being stored in a memory associated therewith, whether embodied in the same or a separate electronic chip. The transmitted signals with respect to the wireless article may include information that is stored in the memory of or associated with the electronic device and may include information previously received and stored therein.

Such device or other wireless article may be part of the object to be detected/identified, or may be made on a rigid or flexible substrate that is placed with and/or attached to such object, such as by adhesive or a strap or tie or the like, or by being packaged therewith, either permanently or releasable, as may be desired for a particular application. Where the object is metallic or otherwise electrically conductive, the wireless article can be spaced away from the object a sufficient distance, e.g., a few millimeters, to allow operation of its antenna for communication of signals.

Figure 4:
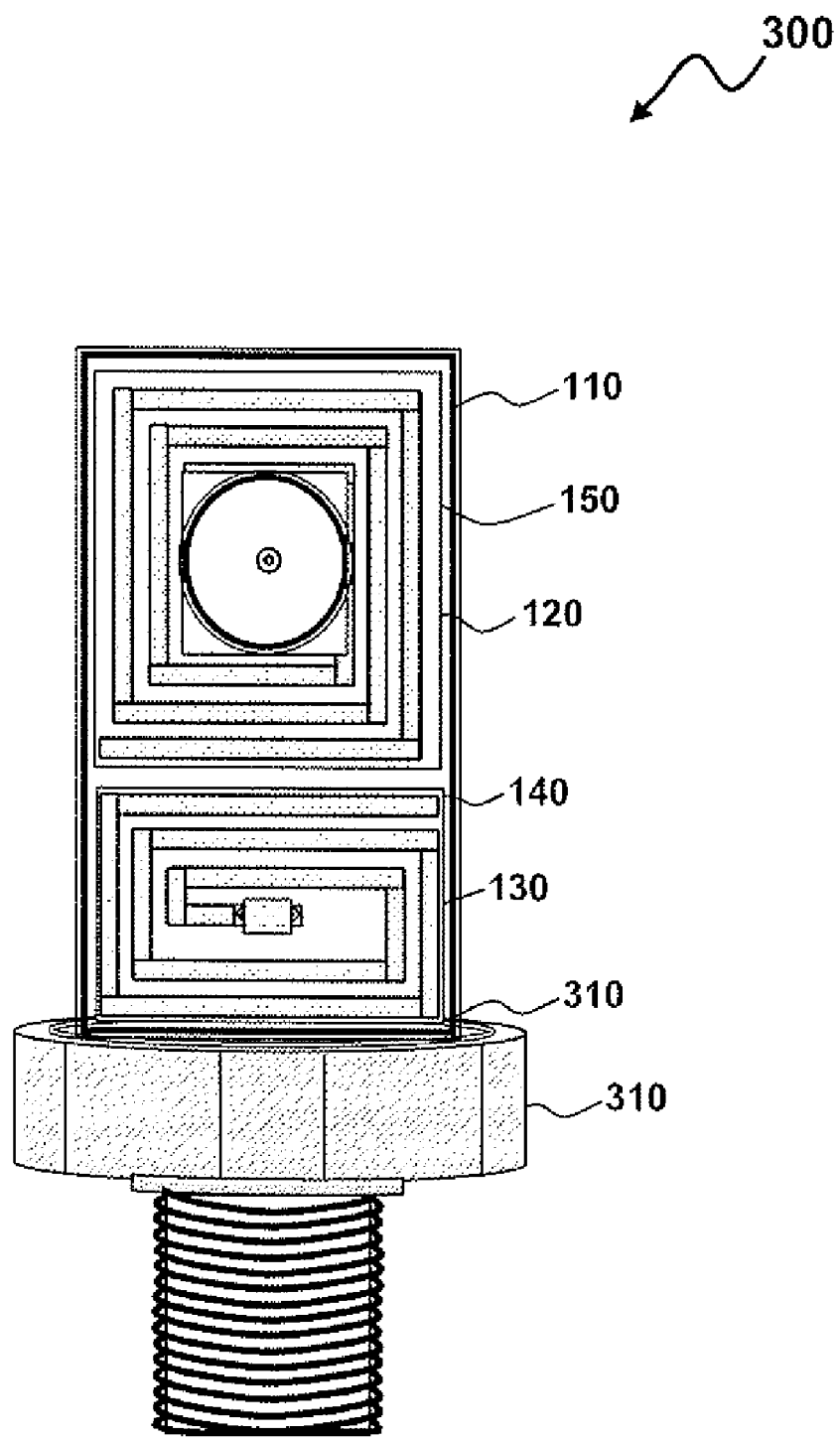
FIG. 4 illustrates a perspective view of the sensor antenna assembly of FIG. 3 mounted on a stainless steel port, in accordance with an alternative embodiment.

Referring to FIG. 4 a perspective view of the sensor antenna assembly 100 mounted on a stainless steel port 310 is illustrated, in accordance with an alternative embodiment. The sensor apparatus 300 includes the sensor antenna assembly 100 mounted on a stainless steel port 310, such as, for example, a stainless steel material. The sense element 164 of the pressure sensor package 150 is bonded to the stainless steel port 310 in order to measure diaphragm deformations.

Figure 5:
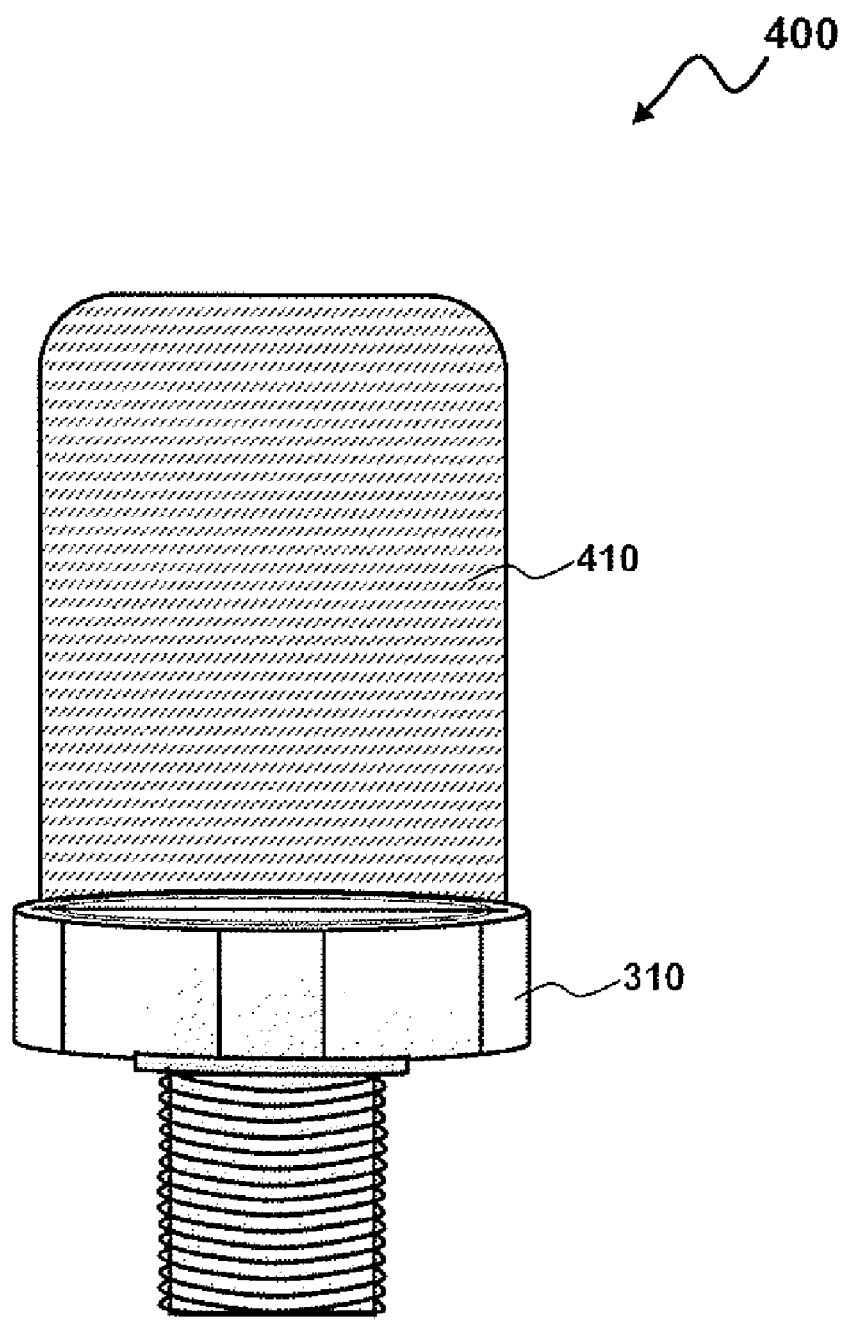
FIG. 5 illustrates a perspective view of a packaged pressure sensor apparatus, in accordance with a preferred embodiment.

Referring to FIG. 5 a perspective view of the sensor package assembly 400 with plastic cover 410 is illustrated, in accordance with an alternative embodiment. The sensor assembly 100 can be overpackaged with a plastic cover 410 once placed on the stainless steel port 310 for sealing the sensor package 150, and the RFID device 130 when included with the SAW sensor in the package 400. The dimensions of cover 410 may vary, depending on the needs and use of such a device. This SAW sensor package 150 can also be overpackaged by welded into a fitting, threaded port, or automotive style housing and can be utilized in food and beverage, dairy, kidney dialysis, infusion pumps, air compressors, hydraulic controls, transportation, aerospace, agriculture, oil refinery, refrigeration and general industrial applications.

The sensor apparatus 400 can be interrogated utilizing a radio frequency band of 434 MHz, which is the standard ISM (Industrial, Scientific and Medical) band. A portion of the interrogation signal can be used to excite the SAW sense element 164 inside the sensor 150 as shown in FIG. 1B.

After the sensor element 164 reaches resonation, a resonant frequency can be transmitted to the user through the SAW sensor antenna 120. This resonant frequency changes with the pressure and temperature that is applied to the sensor apparatus 400. In some SAW device embodiments, monitoring device frequency and any changes thereto provide sufficient information to determine parameters such as temperature and strain to which a SAW device is subjected.

Figure 6:
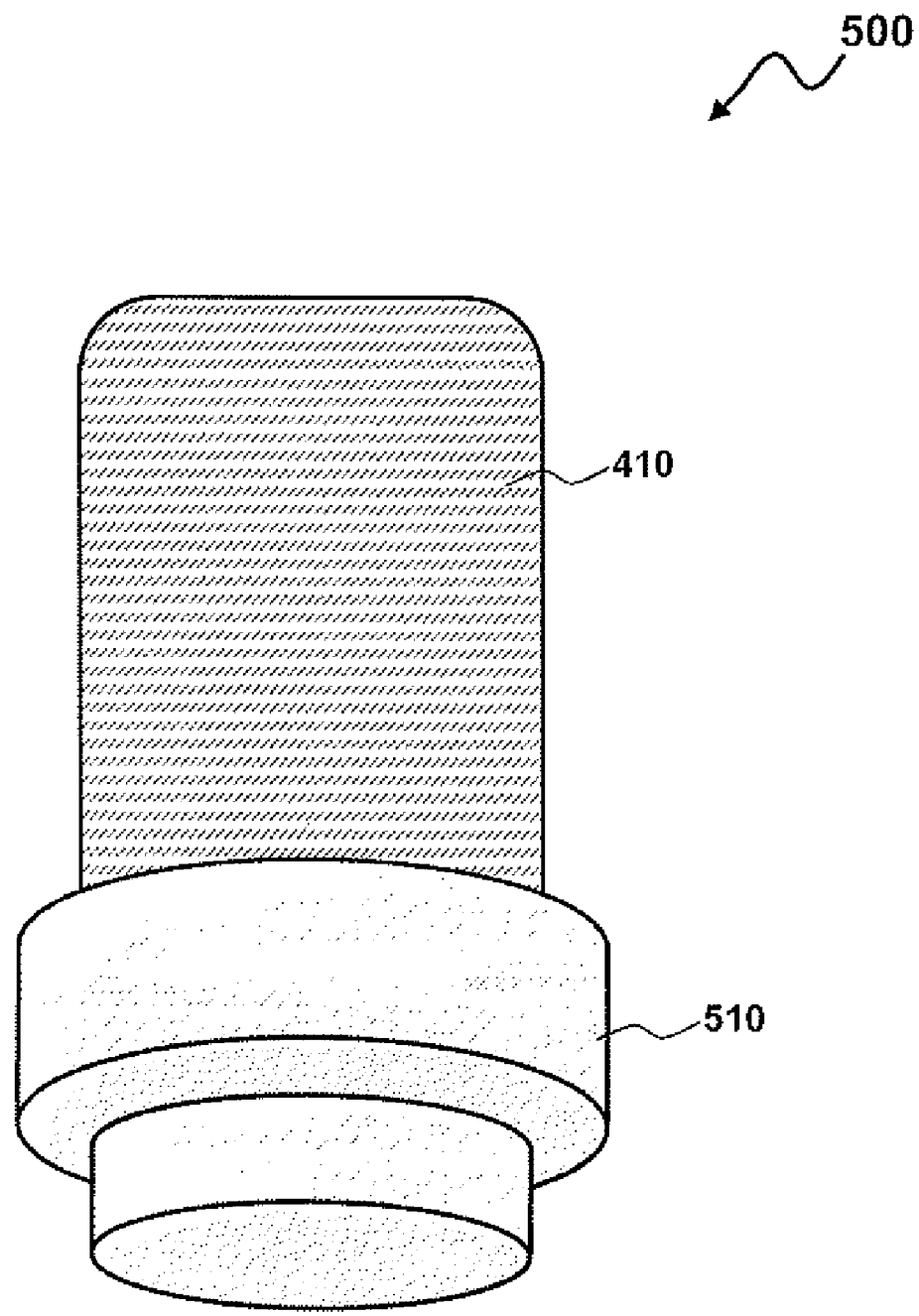
FIG. 6 illustrates a perspective view of the pressure sensor apparatus with flush mount port, in accordance with an alternative embodiment.
Figure 7:
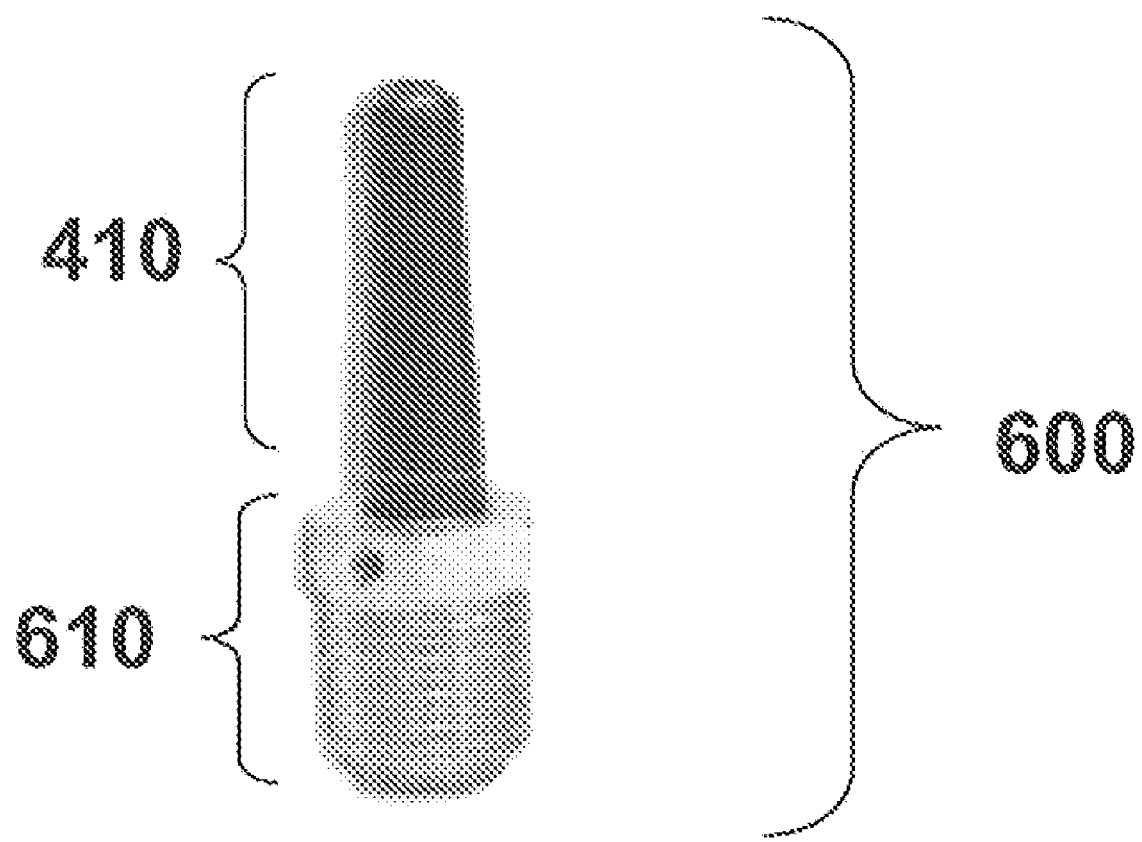
FIG. 7 illustrates a perspective view of a miniature port style pressure sensor apparatus, in accordance with an alternative embodiment.

Referring to FIG. 6 a perspective view of a pressure sensor apparatus 500 with flush mount port 510 is illustrated, in accordance with an alternative embodiment. The dimple 162 translates external pressure to mechanical force against the sense element 164. The flush mount port 510 is ideal for medical, beverage and food processing applications where stringent sanitation requirements are necessary. Note that flush mount port 510 can be configured from stainless steel. Referring to FIG. 7 a photograph of a miniature port pressure and temperature sensor apparatus 600 is shown, in accordance with an alternative embodiment. The sensor antenna assembly 420 can be placed with and/or attached to a miniature port 610.

Figure 8:
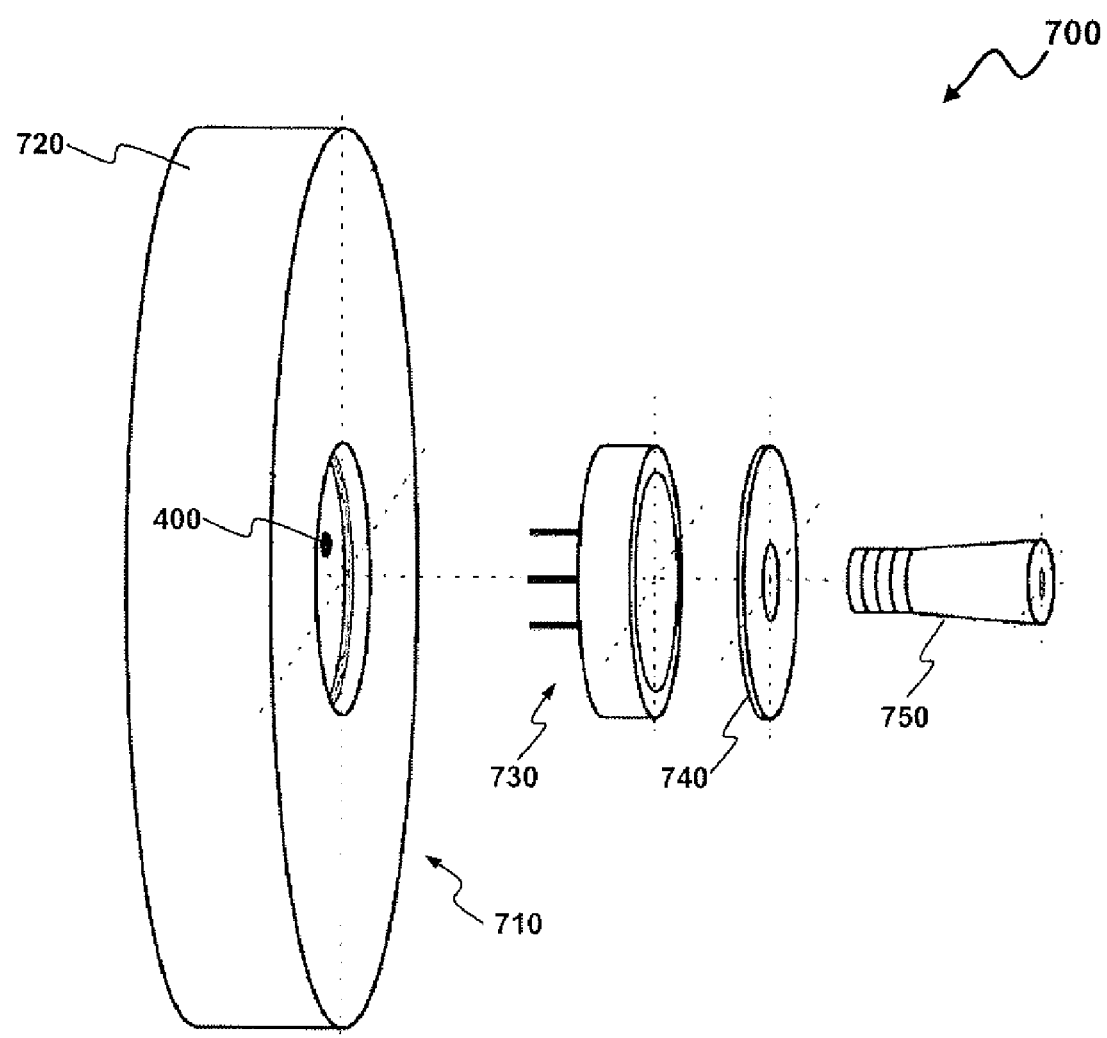
FIG. 8 illustrates an exploded view of a tire sensor system, which can be implemented in accordance with an alternative embodiment of the present invention.

Referring to FIG. 8 an exploded view a tire sensor system 700 is illustrated, which can be implemented in accordance with an alternative embodiment of the present invention. System 700 can be implemented in the context of a tire 710 associated with, for example, a drum-type brake. It can be appreciated, however, that system 700 can be implemented in the context of other brake systems, such as disk brakes, and that the drum-type brake configuration is presented herein for general illustrative and edification purposes only. Tire 710 generally includes a tire rim 720. System 700 includes a brake drum 730, which can interact with a backing plate 740, which in turn surrounds a vehicle axle 750.

System 700 also incorporates sensor apparatus 400, 500 and 600, which is described in greater detail herein with respect to FIGS. 1-7. System 700 can be utilized to monitor the temperature and pressure of tire 710 by locating sensor apparatus 400, 500 and 600 at a particular location within or on tire 710. A wireless signal (e.g., radio frequency, low frequency, etc.) can be transmitted to sensor apparatus 400, 500 and 600. Pressure and air temperature data can then be transmitted back for further collection and evaluation.

The sensor antenna assembly 100/200 and the stainless steel port 310 can be utilized as a wireless and batteryless pressure and temperature sensor that can be used in a wide variety of applications. The sensor apparatus 400 utilizes surface acoustic wave (SAW) technology for the sensor technology and, when used, a passive radio frequency identification (RFID) technology for sensor identification. The key applications may be in Tire Pressure Monitoring Systems (TPMS) 700 where the sensor apparatus 400 can be integrated with the valve stem inside the tire 710, strapped on the rim 720 inside the tire 710 utilizing sensor apparatus 600, and mounted to the rim 720 outside the tire 710 utilizing sensor apparatus 500.

The sensor apparatus such as apparatus 400, 500 and 600 is ideal for equipment that has moving parts such as tires, wheels, suspensions, assembly machines, rotary filling machines, rotary pumps, pistons, valves, and other pressure tanks or vessels. These sensors can be ideal for mobile, portable, or un-stationary equipment. The sensor apparatus can be interrogated with low power RF signals and can be ideal for applications that require intrinsically safe and explosion proof components. The sensor apparatus 400, 500 and 600 is resistant to the effects of shock, vibration and hostile environments. A wide variety of pressure ranges, port styles, and termination types can be utilized with respect to the sensor antenna assembly 100. The wireless technology allows the measurement of pressure and temperature from inside the tire 710 to help truck fleet managers accurately monitor tire pressure for improved fuel efficiency and extended tire life.

The invention described herein can be implemented, in accordance with one possible embodiment, as a product in a component in a wireless and batteryless tire pressure monitoring system (TPMS). Although described in detail as a possible application, TPMS should not be viewed as a limitation over the present invention as it will be appreciated that many other industrial and commercial applications are possible for the wireless, batteryless sensor described herein. Such an exemplary embodiment as TPMS can be configured as a small-size device, which is also lightweight and based on batteryless operation. The pressure sensor described herein does not consume power when implemented. Thus, the present invention can be embodied in a practical and low cost design solution. Such a design can be mass-produced for automotive, heavy-duty vehicles, and commercial markets.

It will, therefore, be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A wireless and batteryless pressure sensor apparatus, comprising:
   a SAW sensor having at least one SAW die with at least one SAW resonator for measuring applied pressure and/or temperature due to change in a resonant frequency of the at least one SAW resonator;
   an antenna connected to said SAW sensor such that said antenna is configured to communicate wirelessly with a remote interrogator unit, said antenna configured to receive an interrogating radio frequency (RF) signal, and to transmit an RF response from the SAW sensor back to the remote interrogator unit, the RF response including at least a measure related to the resonant frequency of the at least one SAW resonator representing at least one of pressure and temperature; and
   a sensor package including a base for mounting and containing said SAW sensor and said antenna;
   wherein said SAW sensor is designed in a stainless steel button package having a sensor diaphragm, and along with said sensor package, comprises a shape that is adaptable for measuring at least one of pressure and temperature.

2. The apparatus of claim 1 wherein said sensor package base comprises a threaded port made of at least one of steel and plastic.

3. The apparatus of claim 1 further comprising a passive RFID device included in said sensor package and connected to an antenna for wireless interrogation of a sensor identity (ID) by the remote interrogator unit.

4. The apparatus of claim 3 wherein at least one of the SAW antenna and RFID antenna comprises at least one of a printed circuit antenna, a helical antenna, and a loop antenna.

5. The apparatus of claim 1 wherein said stainless steel button package is welded onto a threaded stainless steel port to expose at least part of the sensor diaphragm to a media through the port.

6. The apparatus of claim 1 wherein said stainless steel button package is mounted onto a threaded plastic port using at least one of an elastomer O-ring and/or an epoxy, and said stainless steel button package is mounted onto said threaded plastic port to expose at least part of the sensor diaphragm to a media through the plastic port.

7. The apparatus of claim 1 wherein a non-sensor side of the SAW Sensor is sealed from external fluids exposure using a cover.

8. The apparatus of claim 1 wherein said SAW Sensor is integrated into a moving object, wherein said SAW sensor measures at least one of media pressure and media temperature within the moving object.

9. The apparatus of claim 1 wherein said sensor package further includes a cover coupled to the base, the cover and the base together define a cavity that houses the stainless steel button package and the antenna.

10. A wireless and batteryless sensing apparatus, comprising:
- a printed circuit board;
- a SAW sensor package mounted or formed on said printed circuit board for receiving an interrogating radio frequency (RF) signal from a remote interrogator unit and for transmitting a SAW sensor RF response back to the remote interrogator unit, wherein the RF response includes a measure related to at least one resonant frequency for use in determining pressure and/or temperature;
- an RFID device mounted or formed on said printed circuit board with said SAW sensor package;
- at least one antenna in communication with said SAW sensor package and/or said RFID device such that said at least one antenna communicates electrically with said SAW sensor package and/or said RFID device and permits wireless and batteryless interrogation of said SAW sensor package and/or said RFID device by the remote interrogator unit;
- a package base for mounting said printed circuit board, the SAW Sensor package, and the RFID device; and
- a package cover, wherein the package cover and package base together define a cavity for housing said SAW sensor package, printed circuit board and said RFID device.

11. The apparatus of claim 10 wherein said SAW sensor package further comprises a sensor diaphragm and a surface acoustic wave sensing element for use in measuring at least one of pressure and temperature.

12. The apparatus of claim 11 wherein said package base further comprises a threaded port made of stainless steel or plastic, and said SAW sensor package includes stainless steel.

13. The apparatus of claim 12 wherein said threaded port is made of stainless steel and said SAW sensor package, in the form of a stainless steel button, is welded onto said threaded port in a way that protects a non-sensing side of the SAW sensor package, the at least one antenna, and the RFID device from a media while exposing the sensor diaphragm to the media.

14. The apparatus of claim 12 wherein said threaded port is made of plastic and the SAW sensor package is in the form of a stainless steel button package, and the SAW sensor package is mounted onto said threaded port using at least one of an elastomer O-ring and an epoxy, and is mounted such that the at least one of the elastomer O-ring and epoxy seals a non-sensing side of the SAW sensor package, at least one antenna, and RFID device from a media while exposing the sensor diaphragm of the SAW sensor package to the media.

15. The apparatus of claim 10 wherein said package base and package cover comprise a shape that is adaptable for measuring use in at least one of pressure and temperature.

16. The apparatus of claim 10 wherein said package cover comprises a plastic material.

* * * * *